United States Patent
Bistrika et al.

(10) Patent No.: US 9,932,237 B2
(45) Date of Patent: Apr. 3, 2018

(54) CHEMICAL STABILIZATION OF GRAPHITE SURFACES

(71) Applicant: Oregon State University, Corvallis, OR (US)

(72) Inventors: Alexander A. Bistrika, Corvallis, OR (US); Michael M. Lerner, Corvallis, OR (US); Alexandre F. T. Yokochi, Corvallis, OR (US)

(73) Assignee: Oregeon State University, Corvallis, OR (US)

( * ) Notice: Subject to any disclaimer, the term of this patent is extended or adjusted under 35 U.S.C. 154(b) by 308 days.

(21) Appl. No.: 14/423,391

(22) PCT Filed: Aug. 23, 2013

(86) PCT No.: PCT/US2013/056463
§ 371 (c)(1),
(2) Date: Feb. 23, 2015

(87) PCT Pub. No.: WO2014/032005
PCT Pub. Date: Feb. 27, 2014

(65) Prior Publication Data
US 2015/0183643 A1    Jul. 2, 2015

Related U.S. Application Data

(60) Provisional application No. 61/693,074, filed on Aug. 24, 2012.

(51) Int. Cl.
*C01B 31/04*     (2006.01)
*B08B 17/02*     (2006.01)
(Continued)

(52) U.S. Cl.
CPC .............. *C01B 31/04* (2013.01); *B08B 17/02* (2013.01); *C09D 5/1618* (2013.01);
(Continued)

(58) Field of Classification Search
CPC ............ H01M 4/96; H01M 8/18; H01M 8/20; H01M 8/188; B63B 59/04; C01B 31/04;
(Continued)

(56) References Cited

U.S. PATENT DOCUMENTS 6,173,669 B1 * 1/2001 Staerzl .................... B63B 59/04
                                                        114/222
8,993,793 B1 * 3/2015 Lin ......................... C07C 67/08
                                                        502/158
(Continued)

FOREIGN PATENT DOCUMENTS

| CN | 86 104 135 A | 6/1988 |
| WO | WO 2012/061603 | 5/2012 |
| WO | WO2012061603 | * 5/2012 |

OTHER PUBLICATIONS

Extended European Search Report issued by European Patent Office dated May 3, 2016, for corresponding European Patent Application No. 13831615.3, 8pp.

(Continued)

*Primary Examiner* — Ula C Ruddock
*Assistant Examiner* — Matthew W Van Oudenaren
(74) *Attorney, Agent, or Firm* — Klarquist Sparkman, LLP (57) ABSTRACT

Embodiments of a device, or a component of a device, including a stabilized graphite surface, methods of stabilizing graphite surfaces, and uses for the devices or components are disclosed. The device or component includes a surface comprising graphite, and a plurality of haloaryl ions and/or haloalkyl ions bound to at least a portion of the graphite. The ions may be perhaloaryl ions and/or perhaloalkyl ions. In certain embodiments, the ions are perfluorobenzenesulfonate anions. Embodiments of the device or component including stabilized graphite surfaces may maintain a steady-state oxidation or reduction surface current (Continued)

density after being exposed to continuous oxidation conditions for a period of at least 1-100 hours. The device or component is prepared by exposing a graphite-containing surface to an acidic aqueous solution of the ions under oxidizing conditions. The device or component can be exposed in situ to the solution.

25 Claims, 6 Drawing Sheets

(51) Int. Cl.
*H01M 4/86* (2006.01)
*H01M 4/96* (2006.01)
*H01M 8/18* (2006.01)
*H01M 8/20* (2006.01)
*C09D 5/16* (2006.01)
*B63B 59/04* (2006.01)
*C08K 3/04* (2006.01)

(52) U.S. Cl.
CPC ........... *H01M 4/8668* (2013.01); *H01M 4/96* (2013.01); *H01M 8/188* (2013.01); *H01M 8/20* (2013.01); *B63B 59/04* (2013.01); *C08K 3/04* (2013.01); *Y02E 60/528* (2013.01)

(58) Field of Classification Search
CPC ...... C09D 5/16; C09D 5/1606; C09D 5/1612; C09D 5/1618; C09D 5/1625; B08B 17/02
See application file for complete search history.

(56) References Cited

U.S. PATENT DOCUMENTS

| | | |
|---|---|---|
| 2009/0023041 A1 | 1/2009 | Cooper |
| 2011/0133132 A1* | 6/2011 | Zhamu .................. B82Y 30/00 252/503 |
| 2011/0200848 A1* | 8/2011 | Chiang ............... B60L 11/1875 429/4 |

OTHER PUBLICATIONS

Graphite Store Product Data sheet—GM-10, http://graphitestore.com/pop_up_grades.asp?gr_name=GM-10; downloaded Jun. 18, 2012.
Graphite Store Product Data sheet—GR-940, http://graphitestore.com/pop_up_ grades.asp?gr_name=GR-940; downloaded Jun. 18, 2012.
International Search Report and Written Opinion, dated Dec. 19, 2013, issued in corresponding International Application No. PCT/US2013/056463.
Matsunaga et al., "Prevention of Marine Biofouling Using a Conductive Paint Electrode," *Biotechnology and Bioengineering*, 59(3):374-378, Aug. 5, 1998.
Skyllas-Kazacos, et al., "Progress in Flow Battery Research and Development," *J. of the Electrochem. Soc.*, 158(8):R55-R79, 2011.
Zhang et al., "Chemical Synthesis of Graphite Perfluorooctanesulfonate Using $K_2MnF_6$ in Hydrofluoric Acid or Mixed Acid Solutions," *Chem. Mater.*, 11:1100-1109, 1999.
Zhang et al., "Air stability and surface passivation of acceptor-type graphite intercalation compounds," *Carbon*, 38:1775-1783, 2000.

* cited by examiner

CHEMICAL STABILIZATION OF GRAPHITE SURFACES

CROSS REFERENCE TO RELATED APPLICATION

This is the U.S. National Stage of International Application No. PCT/US2013/056463, filed Aug. 23, 2013, which was published in English under PCT Article 21(2), which in turn claims the benefit of U.S. Provisional Application No. 61/693,074, filed Aug. 24, 2013, which is incorporated in its entirety herein by reference.

ACKNOWLEDGMENT OF GOVERNMENT SUPPORT

This invention was made with government support under Cooperative Agreement Number 51286 awarded by the Bonneville Power Administration and DE-FG36-08G018179 awarded by Department of Energy Award. The government has certain rights in the invention.

FIELD

This disclosure pertains to devices including a component having at least one surface comprising chemically stabilized graphite, and methods for making and using the devices and components.

BACKGROUND

Devices including graphite are useful in a wide range of electrochemical systems. For example, graphite electrodes are used in some batteries, and some ship hulls include a conductive graphite coating to prevent or minimize biofouling. However, devices with graphite surfaces may exhibit performance degradation over time due to surface degradation, particularly in aqueous solutions. The primary degradation mechanism for unmodified graphite surfaces reportedly arises from the formation of surface hydroxyl, carbonyl, and carboxyl groups (Kautek et al., *Electrochimica Acta* 2001, 47:815-823; Matsumoto et al., *J. of the Electrochemical Society* 2009, 156:B1208-B1211).

SUMMARY

Embodiments of a device, or a component of a device, comprising a stabilized graphite surface, a method for stabilizing devices or components comprising a graphite surface, and methods for using the devices or components are disclosed. Embodiments of the device or component include a surface comprising graphite, and a plurality of ions bound to at least a portion of the graphite, where the ions are haloaryl ions, haloalkyl anions, or a combination thereof. In some embodiments, the ions are perhaloaryl ions and/or perhaloalkyl anions. In certain embodiments, the ions are perfluoroaryl anions, such as perfluorobenzenesulfonate anions. The ions may form a discontinuous coating on the surface, and may be adsorbed preferentially at edges of graphene sheets on the surfaces. In some embodiments, the ions are perhaloaryl ions, and there is substantially no intercalation of perhaloaryl ions into the graphite.

In some embodiments, the device or component is an electrode having a surface comprising graphite. The electrode may be a graphite electrode, or a composite graphite electrode. In some embodiments, the electrode has a first surface current density (i.e., oxidation current density or reduction current density) measured at a first time and a subsequent surface current density measured at a subsequent time, and the first and subsequent surface current densities are substantially the same. The first and subsequent surface current densities may be oxidation current densities or reduction current densities. In some embodiments, the electrode is operated at an over-potential from 1-150 mV and an oxidation rate from 1-80 $mA \cdot cm^{-2}$. The electrode may be exposed to continuous oxidizing conditions between the first time and the subsequent time. In certain embodiments, the subsequent time is at least 1 hour, at least 10 hours, or at least 100 hours after the first time. In one embodiment, the electrode is exposed to a charge of at least 0.5 ampere-hours (Ah) between the first time and the subsequent time. In another embodiment, the electrode is exposed to a charge of at least 5 Ah between the first time and the subsequent time.

In one embodiment, a cell or half-cell includes an electrode comprising stabilized graphite as disclosed herein. In another embodiment, a flow-cell battery includes an anode, a cathode, and a separator, where at least one of the anode and the cathode is an electrode comprising stabilized graphite.

In some embodiments, the device is a marine vessel and at least a portion of the vessel's hull includes a surface coating comprising stabilized graphite. In another embodiment, the device is a pipe and at least a portion of the pipe's inner surface and/or outer surface includes a surface coating comprising graphite. In some embodiments, the surface coating comprising stabilized graphite is operable as an anode, thereby preventing attachment of fouling organisms to the coated surface, e.g., the ship hull or the pipe's surface(s). The coating minimizes or prevents biofouling when the surface is exposed to water, such as seawater.

In some embodiments, a method for stabilizing a device, or a component of a device, including a surface comprising graphite includes providing a device or component having a surface comprising graphite, exposing at least a portion of the surface to a solution comprising a suitable pH, such as an acidic aqueous solution, and an effective concentration of haloaryl anions, haloalkyl anions, or a combination thereof, under oxidizing conditions for an effective period of time such that a plurality of the ions bind to graphite in the exposed portion of the surface. In certain embodiments, the solution includes an effective concentration of perhaloaryl ions, perhaloalkyl ions, or a combination thereof, and an oxidizing agent. In one embodiment, the solution comprises an effective concentration of perfluorobenzenesulfonate anions, a hexafluoromanganate (IV) salt, and hydrofluoric acid. The effective ion concentration may be 0.001 M-0.1 M. In some embodiments, the effective period of time is 5 seconds to 60 minutes. The surface may be exposed to the solution at a temperature from 0° C. to 100° C. In some embodiments, the surface is polished and/or cleaned prior to exposure to the solution. The exposed surface may be washed with acetone, water, or a combination thereof after exposure to the solution for the effective period of time.

In one embodiment, the device or component comprises an electrode with a surface comprising graphite, and exposing at least a portion of the surface to the solution includes flowing the solution through a cell or half-cell including the electrode. In another embodiment, the device or component includes a surface coating comprising graphite, and exposing at least a portion of the surface to the solution includes dipping the device in the solution, spraying the surface with the solution, or coating the surface with the solution.

In certain embodiments, where the surface comprising graphite has sustained oxidative damage as evidenced by a decrease in surface current density at an applied potential over time, exposing at least a portion of the surface to the solution subsequently stabilizes surface current density of the device or component at the applied potential.

The foregoing and other objects, features, and advantages of the invention will become more apparent from the following detailed description, which proceeds with reference to the accompanying figures.

DETAILED DESCRIPTION

Embodiments of a device or a component of a device including at least one surface comprising chemically stabilized graphite, a method for stabilizing a device or component having graphite-containing surfaces, and uses for the device and/or component are disclosed. Embodiments of the disclosed devices or components exhibit much slower rates of surface mechanical degradation and/or electrochemical performance degradation than devices having surfaces comprising untreated, pristine graphite, thereby extending the life expectancy of the surfaces. Mechanical degradation includes partial or complete delamination of surface graphite. Electrochemical performance degradation is evidenced, for example, by a decrease in current density over time at a given applied potential. In some embodiments, the measured reaction rates at the chemically stabilized surface exceed those at untreated surfaces. Advantageously, embodiments of the disclosed method can be performed in one step in situ.

I. Terms and Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Unless otherwise indicated, non-numerical properties such as continuous, homogeneous, and so forth as used in the specification or claims are to be understood as being modified by the term "substantially," meaning to a great extent or degree. Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2).

In order to facilitate review of the various embodiments of the disclosure, the following explanations of specific terms are provided:

Alkyl refers to a hydrocarbon group having a saturated carbon chain. The chain may be cyclic, branched or unbranched. The term haloalkyl refers to an alkyl group having one or more hydrogen atoms replaced by a halogen atom or atoms. When there are plural halogen atoms, the halogen atoms may be the same or different, e.g., —$CH_2Cl$, —$CF_3$, —$CH_2CF_3$, —$CF_2CF_3$, —$CCl_2CF_3$, and the like. The term perhaloalkyl refers to an alkyl group in which all of the hydrogen atoms are replaced by halogen atoms; the halogen atoms may be the same or different.

Anode: An electrode through which electric charge flows into a polarized electrical device. From an electrochemical point of view, negatively-charged anions move toward the anode and/or positively-charged cations move away from it to balance the electrons arriving from external circuitry.

Aromatic or aryl compounds are unsaturated, cyclic hydrocarbons having alternate single and double bonds. Benzene, a 6-carbon ring containing three double bonds, is a typical aromatic compound. The term haloaryl refers to an aryl group having one or more hydrogen atoms replaced by a halogen atom or atoms. When there are plural halogen atoms, the halogen atoms may be the same or different. The term perhaloaryl refers to an aryl group in which all of the hydrogen atoms are replaced by halogen atoms; the halogen atoms may be the same or different.

Cathode: An electrode through which electric charge flows out of a polarized electrical device. From an electrochemical point of view, positively charged cations invariably move toward the cathode and/or negatively charged anions move away from it to balance the electrons arriving from external circuitry.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A cell typically includes an anode, a cathode, and a separator. In use, the cell also includes an electrolyte. A battery includes one or more cells. The terms "cell" and "battery" are used interchangeably when referring to a battery containing only one cell. Alternatively, a battery may include two half-cells, where each half-cell includes one electrode and an electrolyte.

Current collector: A battery component that conducts the flow of electrons between an electrode and a battery terminal. The current collector also may provide mechanical support for the electrode's active material.

Current density: A term referring to the amount of current per unit area. Current density is typically expressed in units of $mA \cdot cm^{-2}$. Surface current density refers to the amount of current per unit surface area.

Electrolyte: A substance containing free ions that behaves as an electrically conductive medium. Electrolytes generally comprise ions in a solution, but molten electrolytes and solid electrolytes also are known.

Intercalation: A term referring to the insertion of a material (e.g., an ion or molecule) into the microstructure of another material. For example, some perhaloalkyl anions can intercalate between graphene layers of a graphite electrode.

Over-potential: A term that refers to the potential difference (voltage) between a half-reaction's thermodynamically determined standard potential, and the potential at which the oxidation-reduction event is experimentally observed.

Passivation: A term that refers to rendering a material surface inactive when exposed to environmental factors such as air or water. For example, metal surfaces may be passivated by oxidation to produce a surface layer of metal oxide, which protects the underlying metal against corrosion.

Separator: A battery separator is a porous sheet or film placed between the anode and cathode. It prevents physical contact between the anode and cathode while facilitating ionic transport.

Specific energy: A term that refers to energy per unit of mass. Specific energy is commonly expressed in units of Wh/kg or J/kg.

Specific power: A term that refers to power per unit of mass, volume, or area. For example, specific power may be expressed in units of W/kg.

Stabilize/stabilized: As used herein, the terms "stabilize" and "stabilized," with respect to a surface, or performance of a component or device, refer to making or having a stable surface or a stable performance, i.e., relatively unchanging, consistent. A stabilized surface is a surface that is resistant to change (e.g., physical, chemical, and/or electrochemical degradation) and undergoes minimal or no degradation over time as described herein. Stabilized electrochemical performance means that the performance (e.g., current density) is relatively unchanged over a period of time.

II. Devices with a Surface Comprising Stabilized Graphite

Embodiments of a device, or a component of a device, including at least one surface comprising stabilized graphite are disclosed. The surface graphite is stabilized with respect to both oxidation and reduction reactions.

Surfaces comprising graphite can be damaged under oxidizing and/or reducing conditions. Oxidative damage can occur, for example, when carbonyl and carboxyl radicals form at surface sites comprising graphite. Oxidative damage may occur substantially immediately at untreated surfaces. Reductive damage can occur, for example, when hydroxyl radicals form at the surface. The degradation can, for example, diminish electrochemical performance of devices including untreated surfaces comprising graphite over time.

Embodiments of the disclosed devices or components include at least one surface comprising chemically modified graphite. The graphite is modified by the adsorption of haloaryl ions, haloalkyl ions, or a combination thereof. In some embodiments, the ions are perhaloaryl ions, perhaloalkyl ions, or a combination thereof. In certain embodiments, the ions are perhaloaryl anions or perhaloalkyl anions, such as perfluoroaryl anions, perfluoroalkyl anions, or a combination thereof. Suitable anions may include, for example, perfluorobenzenesulfonate, perfluorooctylsulfonate, and perfluorobutylsulfonate. Suitable halogenated cations may include, for example, haloammonium cations, such as halogenated tetraalkylammonium cations and halogenated aryl-trialkylammonium cations, and perhaloammonium cations, such as perhalogenated tetraalkylammonium cations and perhalogenated aryl-trialkylammonium cations. Exemplary cations may include perfluorophenyl-trialkylammonium cations and perfluorobutyltrialkylammonium cations. The chemically modified, graphite-containing surface is passivated with respect to oxidation and degradation. However, the modified surface remains electrochemically active, e.g., for oxidation/reduction of an electrolyte.

Figure 1:
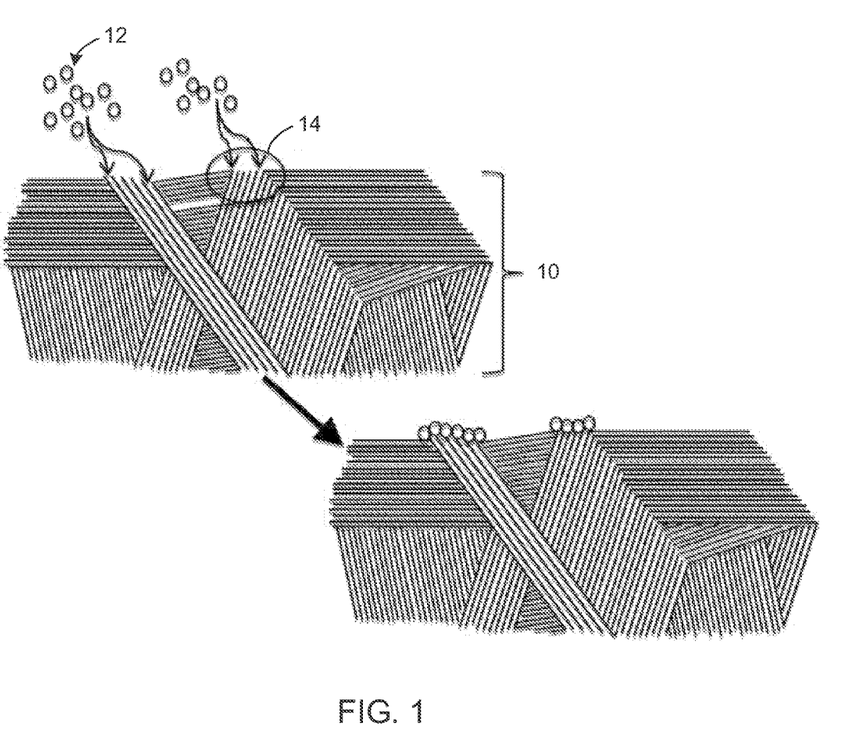
FIG. 1 is a schematic diagram illustrating adsorption of anions to portions of a graphite surface.

FIG. 1 is a schematic diagram of a device 10 having a surface comprising graphite, such as an electrode, wherein a plurality of ions 12 is bound to portions 14 of the surface comprising graphite. The terms "bound" or "binding" as used herein refer to an association between the ions and the graphite surface. The ions can be associated with the graphite surface via adsorption, covalent bonding, π-stacking, or a combination thereof. In some embodiments, the graphite is composite graphite (i.e., a composite material comprising a polymeric matrix (e.g., epoxy, urethane, paraffin, etc.) and graphite filler), and the bound ions form a discontinuous layer on the device surface. As shown in the embodiment exemplified by FIG. 1, the ions 12 may interact preferentially with edge sites 14 of the graphite filler, i.e., at the surface edges between two graphene sheets. In certain embodiments, such as a device where the surface comprises an ordered carbon substrate or carbon nanotube, the bound ions may form a continuous, or substantially continuous, layer on the device surface. In one embodiment, only a portion of a surface comprising graphite is exposed to oxidizing and/or reducing conditions, and the exposed portion is treated to provide a modified surface.

Embodiments of the disclosed devices are suitable for use under oxidizing and/or reducing conditions, such as oxidizing and/or reducing conditions in aqueous environments. Certain embodiments of the devices also may be suitable for use in non-aqueous environments, such as environments including acetonitrile, lower-alkyl alcohols, or ionic liquid-based electrolytes. Some embodiments of the disclosed stabilized graphite surfaces are suitable for use at temperatures up to at least 100° C., such as up to 200° C., or up to 300° C. The disclosed devices may resist oxidative and/or reductive damage at oxidation rates ranging from 1-120 $mA \cdot cm^{-2}$, such as oxidation rates from 1-80 $mA \cdot cm^{-2}$, 10-80 $mA \cdot cm^{-2}$ or 40-80 $mA \cdot cm^{-2}$, at over-potentials ranging from 1-150 mV, such as over-potentials from 10-150 mV, 1-100 mV, 10-100 mV, or 50-100 mV. Embodiments of the devices may resist oxidative damage and/or maintain electrochemical stability (e.g., steady-state oxidation and/or reduction surface current density) for at least 2 hours, at least 5 hours, at least 10 hours, at least 20 hours, at least 100 hours, at least 500 hours, at least one month, at least six months, at least one year, or even for the expected lifetime of the device.

A. Electrodes

In some embodiments, the device is an electrode having a surface comprising graphite. In certain embodiments, the electrode is a graphite electrode, such as a composite graphite electrode. A plurality of haloaryl ions, haloalkyl ions, or a combination thereof is bound to at least a portion of the surface comprising graphite. In some embodiments, the ions are perhaloaryl ions, perhaloalkyl ions, or a combination thereof. In certain embodiments, the ions are perhaloaryl anions, perhaloalkyl anions, or a combination thereof. In another embodiment, the ions are perhaloarylsulfonate anions, perhaloalkylsulfonate anions, or a combination thereof. In yet another embodiment, the anions are perfluoroarylsulfonate anions, perfluoroalkylsulfonate anions, or a combination thereof. Exemplary anions include, but are not limited to, perfluorobenzenesulfonate, perfluorooctylsulfonate, and perfluorobutylsulfonate.

In one embodiment, the electrode consists essentially of graphite (or composite graphite) and a plurality of haloaryl ions, haloalkyl ions, or a combination thereof bound to at least a portion of the electrode surface. In another embodiment, the electrode consists essentially of graphite (or composite graphite) and a plurality of perhaloaryl anions, perhaloalkyl anions, or a combination thereof bound to at least a portion of the electrode surface.

In some embodiments, the ions form a discontinuous layer on the surface, as shown in the embodiment of FIG. 1. In other embodiments, the ions may form a continuous, or substantially continuous, layer on the surface. In one embodiment, only a portion of an electrode surface comprising graphite is exposed to air and/or to an aqueous environment, and the exposed portion is treated to provide a modified surface.

In certain embodiments, when the ions are haloalkyl anions, e.g., $C_1$-$C_{10}$ haloalkyl anions such as perfluorooctylsulfonate, at least some intercalation of the anions between graphene layers may occur in addition to the surface modification. Intercalation typically does not occur when the ions are haloaryl anions, such as perhaloaryl anions. Thus, perhaloaryl anions can be utilized to avoid or minimize intercalation, which may exacerbate mechanical degradation, such as delamination, of graphite electrodes upon battery cycling. In certain embodiments, a stabilized electrode has a plurality of haloaryl ions bound to at least a portion of its surface, and there is substantially no intercalation of the ions into the electrode.

Embodiments of the disclosed stabilized electrodes exhibit increased electrochemical stability and reduced surface damage (e.g., oxidative damage) over time compared to untreated graphite electrodes. For example, some embodiments of the stabilized electrodes are capable of maintaining a steady-state oxidation and/or reduction surface current density for at least 2 hours, at least 5 hours, at least 10 hours, at least 20 hours, or at least 100 hours at 1-150 mV over-potential and an oxidation rate of 1-80 mA·cm$^{-2}$. In some embodiments, a stabilized electrode is capable of maintaining a steady-state oxidation and/or reduction surface current density after exposure to a charge of at least 0.05 ampere-hours (Ah), at least 0.5 Ah, or at least 5 Ah.

B. Coatings

Conductive coatings comprising graphite are used in many applications, such as protective coatings for electronic parts, corrosion shields, and antifouling coatings for marine/aquatic applications. For example, marine vessel hulls may include a conductive, anti-fouling coating comprising graphite. The coating may comprise additional components, such as a binder and/or carbon fibers. In some embodiments, the coating is a composite comprising graphite and polyurethane, such as a composite including 45-60 wt % graphite and 40-55 wt % polyurethane. The graphite coating functions as an anode, and the marine vessel further includes a cathode and a power supply. Seawater functions as the electrolyte. An electrical current is passed through the graphite coating, thereby electrochemically passivating the hull and preventing or minimizing attachment of fouling organisms. Without being limited to a single theory of operation, when an electrical current passes through the graphite coating, halide ions, $X^-$, are oxidized to $X_2$. For example, chloride in the seawater is oxidized to $Cl_2$, which subsequently reacts with hydroxide formed at the cathode to produce hypochlorite, $ClO^-$. An equilibrium between $ClO^-$ and HClO is established, with the concentrations dependent at least in part upon the seawater's pH. If the concentration of chlorine, including hypochlorite and hypochlorous acid is sufficient, fouling organisms are prevented from attaching to the hull surface. In some applications, the minimum effective concentration is 0.5 ppm "free chlorine equivalent." Corresponding reactions occur with bromide ions in seawater. Voltages greater than 1.0 V versus SCE (saturated calomel electrode) increase bromine and chlorine equilibrium concentrations to levels that are toxic to marine organisms. In one example, a potential of 1.05 V (vs. Ag|AgCl in 3.5 wt % NaCl) has been shown to effectively prevent biomass accumulation on a graphite coating exposed to ocean conditions on the United States west coast. In another example, graphite-polyurethane paint cycled between being held at 1.2 V versus SCE for 1 hour and −0.6 V versus SCE for 10 minutes was shown to effectively prevent marine biofouling in seawater for up to a year (*Biotechnology and Bioengineering*, 59:374-378, 1998).

The useful lifetime of a graphite coating exposed to oxidizing and/or reducing conditions can be extended by stabilizing the graphite surface as disclosed herein. Embodiments of stabilized graphite coatings comprise a plurality of haloaryl ions, haloalkyl ions, or a combination thereof bound to at least a portion of the graphite coating surface. In some embodiments, the ions are perhaloaryl ions, perhaloalkyl ions, or a combination thereof. In certain embodiments, the ions are perhaloaryl anions, perhaloalkyl anions, or a combination thereof, such as perfluoroaryl anions, perfluoroalkyl anions, or a combination thereof.

III. Methods of Stabilizing Surfaces Comprising Graphite

In some embodiments, a device, or component of a device, that includes one or more surfaces comprising graphite is stabilized in a one-step method. In certain embodiments, the method includes exposing the surface graphite to a solution, or reaction medium, having a suitable pH and comprising an effective concentration of haloaryl ions, haloalkyl ions, or a combination thereof and a strong oxidizing agent. In some embodiments, the effective ion concentration is at least 0.001 M, such as 0.001 M to 1 M, 0.001

M to 0.1 M, 0.001 M to 0.01 M, or 0.001 M to 0.005 M. In some examples, the effective ion concentration was 0.002-0.004 M.

Strong oxidizing agents include, without limitation, hexafluoromanganate, permanganate, chromate, and nitric acid. One exemplary oxidizing agent is potassium hexafluoromanganate (IV). In some embodiments, a suitable pH is achieved with an acidic aqueous solution. Suitable acids include mineral acids, such as hydrofluoric acid and nitric acid. Exposing the graphite to the solution may comprise immersing the graphite in the solution, or applying the solution to the surface by any suitable means, such as dipping, coating, spraying, or flowing the solution across the surface. In some embodiments, the surface is exposed to a solution comprising fluoroaryl ions, fluoroalkyl ions, or a combination thereof and a strong oxidizing agent in hydrofluoric acid. In certain embodiments, the surface is exposed to a solution comprising perfluoroaryl anions, perfluoroalkyl anions, or a combination thereof, and potassium hexafluoromanganate (IV) in hydrofluoric acid. In one example, surfaces comprising graphite were exposed to a reaction medium comprising $Ba(C_6F_5SO_3)_2$ and $K_2MnF_6$ in concentrated hydrofluoric acid.

The surface may be exposed to the reaction medium for a period of time effective to allow binding, such as adsorption, of haloaryl ions, haloalkyl ions, or a combination thereof to the surface. In certain embodiments, the reaction can be monitored by a color change in the reaction medium. For example, a reaction medium comprising 0.1 wt % $Ba(C_6F_5SO_3)_2$ and $K_2MnF_6$ in concentrated hydrofluoric acid (48-50 wt %) has a yellow to orange color, which may fade or disappear within a few minutes of adding graphite. In some embodiments, the effective period of time is 5 seconds to 60 minutes, 30 seconds to 60 minutes, 1-60 minutes, 1-30 minutes, 1-15 minutes, 5-30 minutes, or 5-15 minutes. The effective period of time may depend, at least in part, on reaction medium's ion concentration. As the ion concentration increases, the effective period of time may decrease. The reaction may be performed at ambient temperature, or at temperatures ranging from 0 to 100° C., such as 0-80° C., 0-50° C., 10-30° C., or 20-25° C. As the temperature increases, the effective period of time may decrease. A person of ordinary skill in the art will understand that suitable care should be taken when selecting and using particular combinations of halogenated or perhalogenated ions, oxidizing agents, acids, and/or reaction temperatures.

In some embodiments, the surface is cleaned and/or polished before exposure to the reaction medium. For example, the surface may be polished using fine-grit sand paper, and then cleaned by sonication in deionized water prior to treatment. Following treatment, the modified surfaces are cleaned, such as by rinsing with acetone and/or deionized water. In certain embodiments, the stabilized device is kept under dry nitrogen for long-term storage.

Advantageously, some embodiments of the disclosed method can be performed in situ. For example, a graphite-containing electrode in a previously constructed cell can be stabilized by exposing the electrode to a reaction medium comprising haloaryl ions, haloalkyl ions, or a combination thereof in an acidic aqueous solution under oxidizing conditions for an effective period of time. In a flow cell, the electrode can be exposed to the solution by filling and/or flushing the cell with the solution for an effective period of time. Following stabilization, the electrode is cleaned, such as by rinsing with acetone and/or deionized water.

In another embodiment, a graphite-containing coating on a ship hull or a pipe may be stabilized by applying the reaction medium to the coating and allowing the reaction medium to remain on the coating for an effective period of time before cleaning the modified surface, such as by rinsing with acetone and/or water. In certain embodiments, the useful lifetime of even a previously used device including a surface comprising graphite may be extended by stabilizing the surface as described herein.

A device, or component of a device, including at least one surface comprising graphite that has sustained damage (as determined by, e.g., performance degradation and/or partial delamination), such as oxidative damage, may be stabilized by exposing the surface to a solution comprising haloaryl ions, haloalkyl ions, or a combination thereof in an acidic aqueous solution under oxidizing conditions for an effective period of time. The surface may be polished and/or cleaned as previously described before exposure to the solution. Stabilizing the surface may stabilize the performance and/or extend the lifetime of the device or component. For example, a measured performance characteristic (e.g., surface current density) may remain unchanged or may change by less than 20%, less than 15%, less than 10%, less than 5%, or even less than 2% over a defined period of time, such as at least 2 hours, at least 5 hours, at least 10 hours, at least 20 hours, at least 50 hours, or even at least 100 hours. In certain embodiments, treating the surface also may at least partially restore electrochemical performance, such as by increasing surface current density of the device or component at an applied potential.

IV. Applications

Devices and/or components of a device including surfaces comprising stabilized graphite as disclosed herein are useful in many applications. For example, some embodiments of the devices and components are useful in electrochemical applications where the device or component will be exposed to oxidizing and/or reducing conditions in aqueous media or non-aqueous media such as certain polar organic liquids (e.g., acetonitrile, lower alkyl alcohols) or ionic liquids (e.g., ionic electrolytes).

Embodiments of electrodes comprising stabilized graphite (a "stabilized electrode") are useful in systems comprising one or more graphite-based electrodes, for example, a graphite electrode system used to oxidize/reduce an electroactive species. The disclosed stabilized electrodes may be used for any sort of electrosynthesis in aqueous conditions. Embodiments of the stabilized electrodes also may be used in non-aqueous electrochemical applications, such as electrochemical applications where the electrode is exposed to an ionic electrolyte at temperatures up to at least 100° C., such as up to 200° C.

In some embodiments, a stabilized electrode is used in a flow-through battery system, or flow battery. Flow batteries are rechargeable fuel cells in which an electrolyte flows through an electrochemical cell that reversibly converts chemical energy to electricity. A supply of electrolyte solution is stored externally, and is pumped (or gravity fed) through the cell or cells. Flow batteries can be recharged by replacing the spent electrolyte solution or, in some embodiments, by reversing the reaction.

Similar to other battery systems, flow battery systems include a cathode, an anode, and an electrolyte. Typically, both electrodes are inert and do not take part in the chemical reactions occurring in the battery system. In some embodiments, one electrode acts as a repository for material that is precipitated from or dissolved into the electrolyte as the battery is charged or discharged, respectively. Flow battery systems also may include one or more pumps which pump electrolyte solution from an external reservoir through the flow cell. Some systems include two half-cells, wherein each half-cell comprises one electrode and an electrolyte. Other systems include a single cell having two electrodes, an electrolyte, and a separator to prevent physical contact between the anode and the cathode and/or to prevent certain ions from traveling from one electrode to the other electrode.

Figure 2:
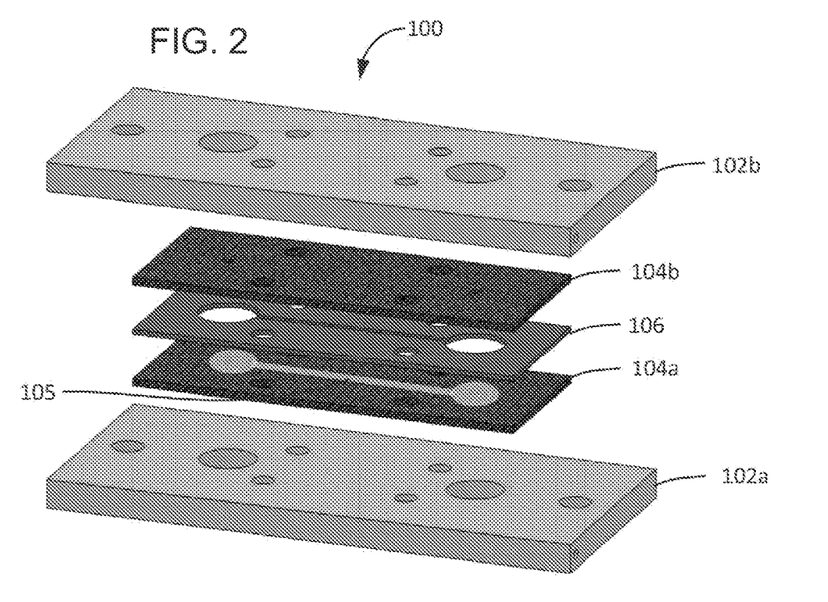
FIG. 2 is an exploded perspective view of one embodiment of a flow-through cell including an embodiment of the disclosed chemically activated graphite electrodes and having a single flow-space arrangement.
Figures 3, 4:
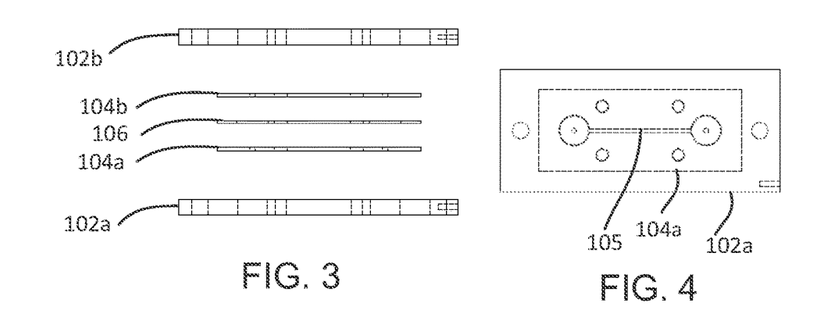
FIG. 3 is a side view of the flow-through cell of FIG. 2.
FIG. 4 is a top view of the flow-through cell of FIG. 3.

FIG. 2 is an exploded perspective view of one embodiment of a flow-through cell 100 having a single flow-space arrangement. FIGS. 3 and 4 are a side view and a top view, respectively, of the flow-through cell of FIG. 2. Cell 100 includes current collector plates 102a, 102b, graphite sheets 104a, 104b, and a spacer 106. Each graphite sheet 104a, 104b may, and preferably does, include a chemically stabilized surface portion 105 (not shown for graphite sheet 104b). Current collector plates 102a, 102b are highly conductive materials, typically a metal, such as aluminum, copper, nickel, tungsten, or zinc. In some examples, the current collector plates were aluminum. Suitable materials for spacer 106 include silicone rubber, polyethylene, polypropylene, polyester (e.g., Mylar®), natural rubber, nitrile rubber, polytetrafluoroethylene, fluoroelastomers (e.g., Viton®), polyether ether ketone (PEEK), and poly(4,4'-oxydiphenylene-pyromellitimide) (Kapton®). In some embodiments, spacer 106 has a thickness from 1-10 mm, such as 1.5 mm, 3 mm, or 5 mm.

Figure 5:
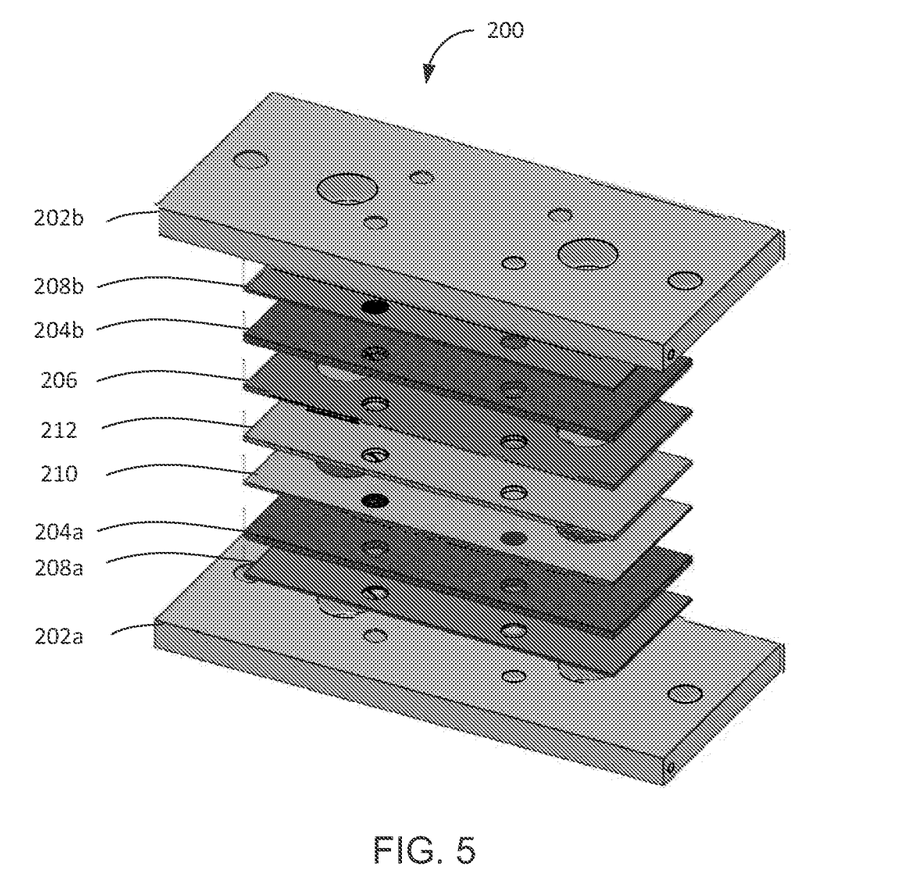
FIG. 5 is an exploded perspective view of one embodiment of a flow-through cell including an embodiment of the disclosed chemically activated graphite electrodes and having a double flow-space arrangement.

FIG. 5 is an exploded perspective view of one embodiment of a flow-through cell 200 having a double flow-space arrangement. Cell 200 includes current collector plates 202a, 202b, graphite sheets 204a, 204b, spacer 206, conductive silicone rubber sheets 208a, 208b, spacer 210, and separation membrane 212. One or both graphite sheets 204a, 204b is chemically stabilized as described herein to produce a stabilized electrode. In some embodiments, spacer 210 is polytetrafluoroethylene (PTFE), such as a PTFE spacer with a thickness of 0.5-5 mm. Suitable materials for separation membrane 212 include, without limitation, porous polypropylene, polyethylene, glass microfiber filters, sulfonated tetrafluoroethylene-based fluoropolymer-copolymers (e.g., Nafion® membrane N115), or membranes comprising cellulose or cellophane (e.g., dialysis membranes). The separation membrane material is selected based at least in part on compatibility with the electrolyte to be used.

A person of ordinary skill in the art of flow-through cell technology will understand that the arrangements shown in FIGS. 2-5 are merely illustrative, and other arrangements including embodiments of the disclosed stabilized electrodes may be used.

Figure 6:
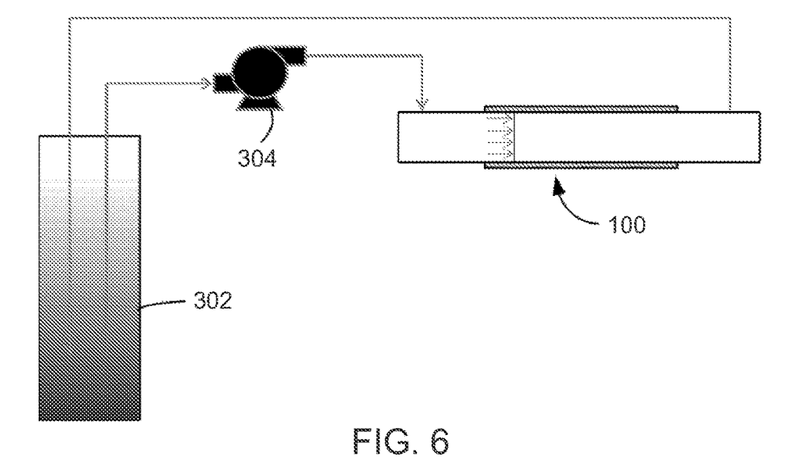
FIG. 6 is a schematic diagram of one embodiment of a flow-cell battery system including the single flow-space cell of FIGS. 2-4.

FIG. 6 is a schematic diagram of one embodiment of a flow-cell battery system 300 including the single flow-space cell 100 of FIGS. 2-4. Battery system 300 also includes electrolyte reservoir 302 and variable-flow pump 304.

Figure 7:
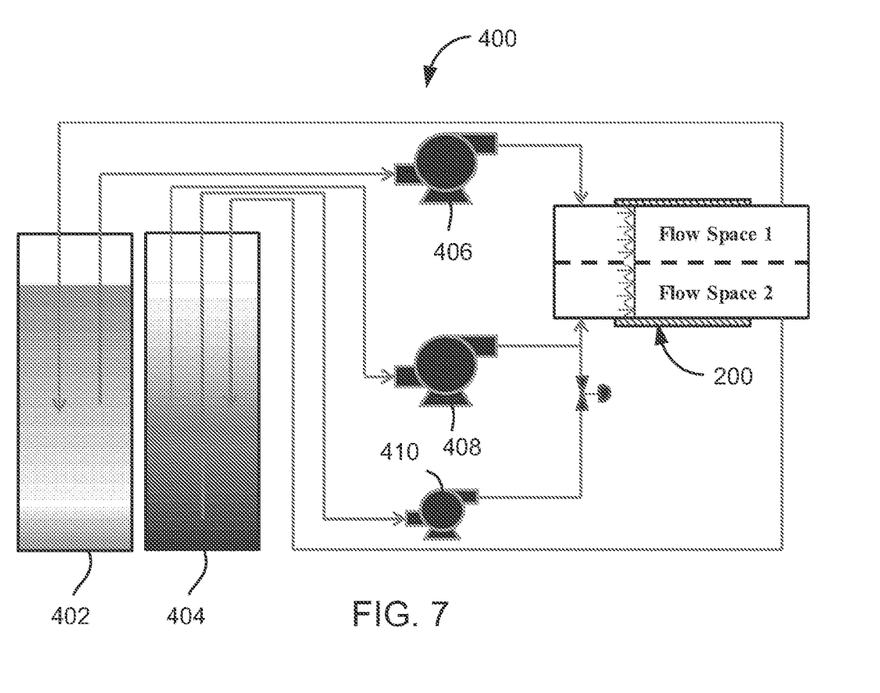
FIG. 7 is a schematic diagram of one embodiment of a flow-cell battery system including the double flow-space cell of FIG. 5.

FIG. 7 is a schematic diagram of one embodiment of a flow-cell battery system 400 including the double flow-space cell 200 of FIG. 5. Battery system 400 also includes electrolyte reservoirs 402, 404 and variable-flow pumps 406, 408, 410. System 400 may be used, for example, as a zinc-bromide battery. Bromide/tri-bromide oxidation/reduction is very damaging to conventional graphite electrodes. Thus, it is advantageous to use a stabilized electrode for the anode. Using a stabilized electrode preserves electrode activity and extends electrode life. Because zinc reduction does not cause undue damage to graphite electrodes, an untreated graphite electrode or a stabilized electrode may be used for the cathode.

Embodiments of the disclosed electrodes comprising stabilized graphite also are suitable for other applications. Exemplary applications include reducing metal salts in aqueous solution, halide oxidation (such as oxidizing chloride to hypochlorite to make bleach), nuclear fuel reprocessing (e.g., uranium extraction or plutonium/uranium recovery by extraction), production of heavy water, electrofluorination, cathodic hydrosiomerization of olefins (e.g., adiponitrile electrosynthesis), Kolbe oxidation (decarboxylative dimerization), electrochemical Birch reduction (hydrogenation of aromatic systems) and the Tafel reduction (rearrangement of the carbon skeleton of substituted acetoacetic esters to hydrocarbons by electrolytic reduction).

Embodiments of the disclosed coatings comprising stabilized graphite are useful as protective, conductive coatings for electronic parts, corrosion shields, and antifouling coatings for marine/aquatic applications. For example, conductive coatings comprising stabilized graphite may be used to passivate ship hulls or pipes (e.g., water-intake pipes for lake, river, or sea water) that are susceptible to biofouling.

V. EXamples

Example 1

Preparation of Chemically Stabilized Graphite Electrodes

A reaction medium was prepared by adding approximately 0.8-1.2 g·L$^{-1}$ K$_2$MnF$_6$ and Ba(C$_6$F$_5$SO$_3$)$_2$ to concentrated hydrofluoric acid having a nominal concentration of 48-50 wt %. Graphite electrode surfaces were cleaned by polishing with fine-grit sand paper, followed by sonication in high-purity deionized water. The cleaned graphite surfaces were immersed in the reaction medium. A reaction was observed within several minutes after immersion as the bright orange reaction medium faded to a dull yellow over the course of a few minutes. No additional changes were observed by visual inspection after the initial time period. Following reaction, the treated surfaces were cleaned by rinsing with acetone and deionized water. For long-term storage, the treated surfaces were stored under dry nitrogen. No special care was taken when moving electrodes to and from electrochemical test beds for analysis. FIG. 1 is a schematic diagram illustrating adsorption of perfluorobenzenesulfonate anions 12 at the graphite-solution interface 14 on a graphite electrode 10.

Example 2

Steady-State Current Density

Chemically activated graphite electrodes were prepared as described above in Example 1. Treated and untreated graphite electrodes were exposed to continuous oxidation in a reactor filled with an electrolyte comprising ~6 M ammonium bromide with approximately 100 g·L$^{-1}$ ammonium nitrate and potassium bromide supporting salts. The reference electrode was an Ag/AgBr electrode in saturated potassium bromide, and was further isolated from the main reactor by a Luggin-type capillary filled with saturated potassium bromide. The counter electrode also was isolated from the main electrolyte by a salt bridge, and contained 100 g·L$^{-1}$ ammonium nitrate as the electrolyte. Before use and after 10 minutes, 1 hour, 10 hours, and 100 hours, the electrodes were removed from the oxidation environment and evaluated for oxidation current density and reduction current density.

Figure 8:
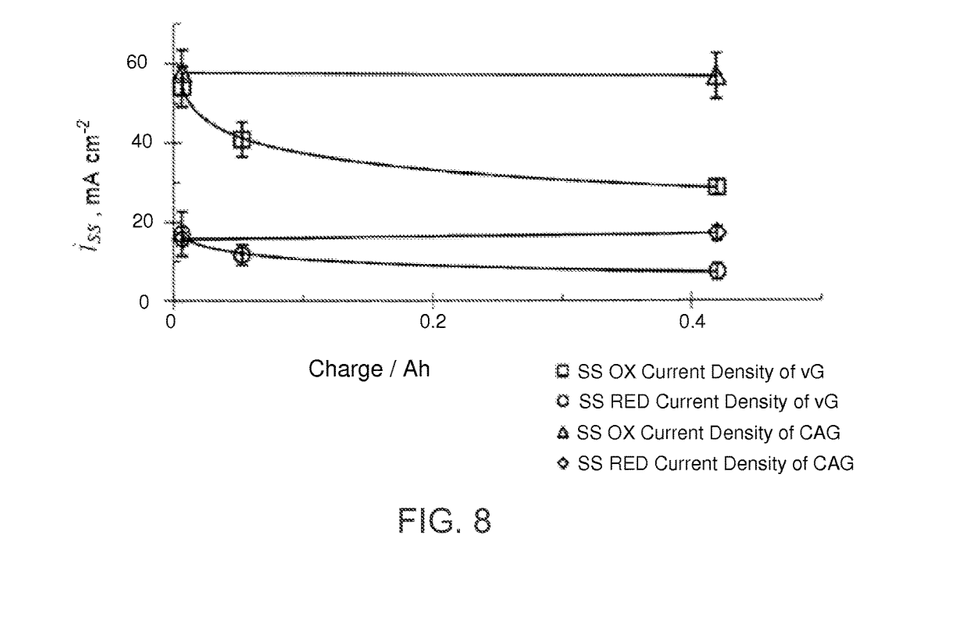
FIG. 8 is a graph illustrating steady-state oxidation current density as a function of time for one embodiment of the disclosed chemically activated graphite electrodes.

The results are shown in FIG. 8. The stabilized graphite electrodes exhibited both steady-state oxidation current density and steady-state reduction current density over a total charge of 0.4 Ah. In contrast, the untreated graphite electrodes (vG) showed a significant decline in both oxidation and reduction current density.

Example 3

Performance Stability of Stabilized Graphite Electrodes

Polished, high-density graphite electrodes and stabilized graphite electrodes prepared by the method described in Example 1 were evaluated for stability during bromide oxidation and reduction. The surfaces of the electrodes were fixed by tightly-fitted Viton® sleeves, exposing only a carefully controlled area of the electrode. The exposed area was measured to be $0.04\pm0.005$ cm$^3$ using an optical microscope equipped with a micrometer. The electrodes were evaluated in a reactor filled with an electrolyte comprising 6 M ammonium bromide with approximately 100 g·L$^{-1}$ ammonium nitrate and potassium bromide supporting salts. The reference electrode was an Ag/AgBr electrode in saturated potassium bromide, and was further isolated from the main reactor by a Luggin-type capillary filled with saturated potassium bromide. The counter electrode also was isolated from the main electrolyte by a salt bridge, and contained 100 g·L$^{-1}$ ammonium nitrate as the electrolyte.

The stabilized graphite electrodes exhibited a steady state current density at a fixed 100 mV over-potential for the Br$^-$/Br$_3^-$ redox pair. The open circuit potential was allowed to stabilize to 0.1 mV for 10 minutes before an oxidation potential was applied. Electrodes were tested at continuous oxidation rates of 40 mA·cm$^2$ or 80 mA·cm$^2$. At intervals, the electrode was removed from the oxidation environment, stored under vacuum, and then analyzed for oxidation current density. Similarly, the electrode was removed from the oxidation environment and analyzed for reduction current density.

Figure 9:
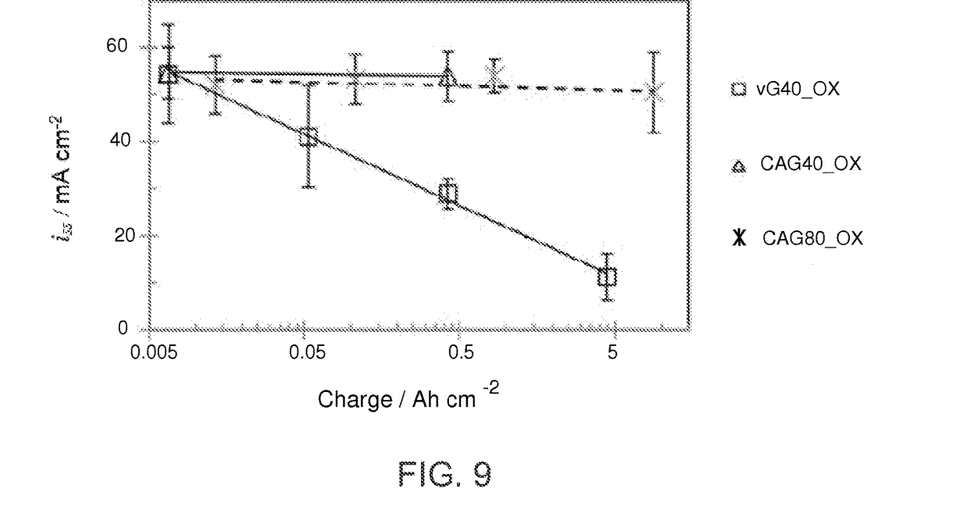
FIG. 9 is a graph illustrating steady-state oxidation current density maintained by two embodiments of the disclosed chemically activated graphite electrodes.

The results of the oxidation study are shown in FIG. 9. Surprisingly, the stabilized graphite electrode run at an oxidation rate of 80 mA·cm$^2$ (CAG80_OX) maintained a steady-state oxidation current density after 100 hours of continuous oxidation (charge of 5 Ah·cm$^2$), whereas untreated graphite (vG40_OX) exhibited a steady decrease in oxidation current density. The stabilized graphite electrode run at an oxidation rate of 40 mA·cm$^2$ (CAG40_OX) also maintained a steady-state oxidation current density over the measured time period.

Figure 10:
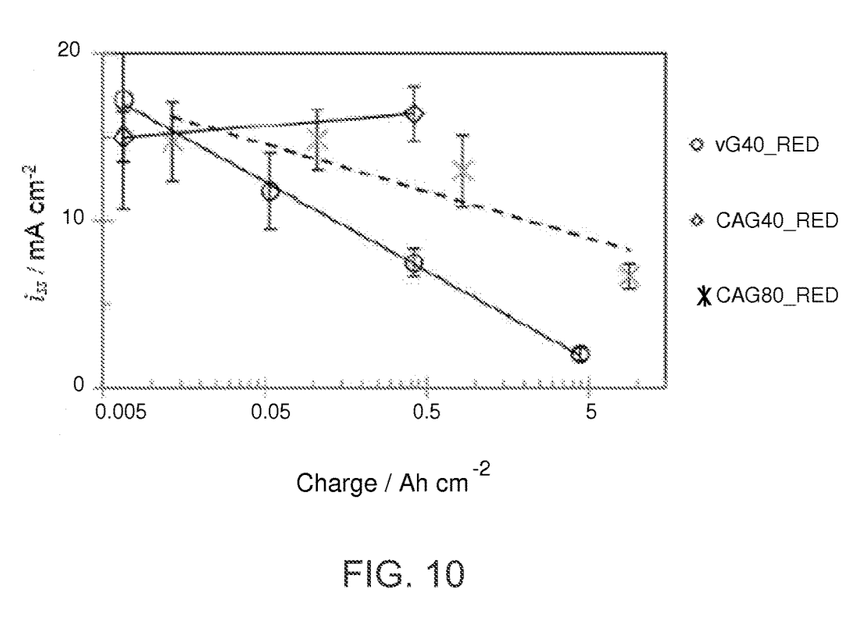
FIG. 10 is a graph illustrating steady-state reduction current density maintained by two embodiments of the disclosed chemically activated graphite electrodes.

The results of the reduction study are shown in FIG. 10. The stabilized graphite electrode run at an oxidation rate of 40 mA·cm$^2$ (CAG40_RED) maintained a steady-state reduction current density after 10 hours of continuous oxidation (0.5 Ah·cm$^2$), whereas untreated graphite (vG40_RED) exhibited a steady decrease in reduction current density. Indeed, the reduction current density of the CAG40_RED electrode appeared to increase over the measured timeframe. The stabilized graphite electrode run at an oxidation rate of 80 mA·cm$^2$ (CAG80_RED) exhibited a decrease in reduction current density over 100 hours; however, the decrease was significantly less than that of untreated graphite.

The preservation of active edge sites available to effect Red/Ox reactions is most likely due to the strong lattice interactions between the oxidized carbon sheets and perfluoroarylsulfonate anions. The activated graphite surface remains Red/Ox active, but prevents further oxidation and thus degradation of the electrode surface. The passivation toward oxidative damage can be seen clearly in FIGS. 9-10.

Embodiments of a device, or a component of a device include a surface comprising graphite and a plurality of ions bound to at least a portion of the graphite, where the ions are haloaryl ions, haloalkyl ions, or a combination thereof. In some embodiments, the ions are perhaloaryl ions, perhaloalkyl ions, or a combination thereof. The ions may be perfluoroaryl ions, for example, perfluorobenzenesulfonate ions.

In any or all of the above embodiments, the ions may form a discontinuous coating on the surface. In any or all of the above embodiments, the ions may be adsorbed at edges of graphene sheets on the surface. In some embodiments, the ions are perhaloaryl ions and there is substantially no intercalation of perhaloaryl ions into the graphite.

In any or all of the above embodiments, the device may be a marine vessel comprising a hull and at least a portion of the hull comprises a surface coating comprising graphite. The surface coating may be operable as an anode thereby preventing attachment of fouling organisms to the portion of the hull.

In any or all of the above embodiments, the device may be a pipe and at least a portion of the pipe's inner surface or outer surface comprises a surface coating comprising graphite. The surface coating may be operable as an anode thereby preventing attachment of fouling organisms to the portion of the pipe's inner surface or outer surface.

In any or all of the above embodiments, the device or component may be an electrode having a surface comprising graphite. In some embodiments, the electrode is a graphite electrode or a composite graphite electrode. In any or all of the above embodiments, the electrode may have a first surface current density measured at a first time and a subsequent surface current density measured at a subsequent time (e.g., at least an hour after the first time), and the first and subsequent surface current densities are substantially the same. In some embodiments, the electrode is operated at an over-potential from 1-150 mV and an oxidation rate from 1-80 mA·cm$^{-2}$. The electrode may be exposed to continuous oxidation conditions between the first time and the subsequent time. In some embodiments, the electrode is exposed to a charge of at least 0.5 ampere-hours, such as a charge of at least 5 ampere-hours, between the first time and the subsequent time. The first and subsequent surface current densities may be oxidation current densities or reduction current densities.

A cell or a half-cell may include a electrode according to any or all of the above embodiments. A flow cell battery may include an anode, a cathode, and a separator, where at least one of the anode and the cathode is an electrode according to any or all of the above embodiments.

Embodiments of a method for stabilizing a device, or a component of a device, having a surface comprising graphite include providing a device, or a component of a device, comprising a surface comprising graphite, and exposing at least a portion of the surface to an acidic aqueous solution comprising an effective concentration of haloaryl ions, haloalkyl ions, or a combination thereof, under oxidizing conditions for an effective period of time such that a plurality of haloaryl ions, haloalkyl ions, or a combination thereof bind to graphite in the exposed portion of the surface. The solution may include (i) an effective concentration of perhaloaryl ions, perhaloalkyl ions, or a combination thereof, and (ii) an oxidizing agent. In some embodiments, the solution includes an effective concentration of perfluorobenzenesulfonate anions, a hexafluoromanganate (IV) salt, and hydrofluoric acid. The effective concentration of ions may be 0.001 M to 1 M. The effective period of time may range from 5 seconds to 60 minutes. In any or all of the above embodiments, exposing at least a portion of the surface to the solution may be performed at a temperature from 0° C. to 100° C.

In any or all embodiments, the method may further include polishing and/or cleaning the portion of the surface prior to exposure to the solution. In any or all of the above embodiments, the method also may include washing the exposed portion of the surface with acetone, water, or a combination thereof after exposure to the solution for the effective period of time.

In any or all of the above embodiments, the surface comprising graphite may have sustained oxidative damage as evidenced by a decrease in surface current density at an applied potential over time, and exposing at least a portion of the surface to the solution subsequently stabilizes the surface current density of the device or component at the applied potential.

In any or all of the above embodiments, the device or component may comprise an electrode with a surface comprising graphite, and exposing at least a portion of the surface to the solution comprises flowing the solution through a cell or a half-cell comprising the electrode. In any or all of the above embodiments, the device or component may comprise a surface coating comprising graphite, and exposing a least a portion of the surface to the solution comprises dipping the device in the solution, spraying the portion of the surface with the solution, or coating the portion of the surface with the solution.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A device, or a component of a device, comprising:
a surface comprising a carbonaceous material; and
a plurality of perhaloaryl ions bound to at least a portion of the carbonaceous material.

2. The device or component of claim 1 where the carbonaceous material comprises graphite.

3. The device or component of claim 1 where the perhaloaryl ions are perhaloarylsulfonate ions.

4. The device or component of claim 1 where the perhaloaryl ions are perfluoroaryl anions.

5. A device, or a component of a device, comprising:
a surface comprising a carbonaceous material; and
a plurality of haloaryl ions bound to at least a portion of the carbonaceous material, where the haloaryl ions are perfluorobenzenesulfonate anions.

6. The device or component of claim 1 where the perhaloaryl ions form a continuous, substantially continuous, or discontinuous layer on the surface.

7. The device or component of claim 1 where the carbonaceous material comprises graphite and the perhaloaryl ions are preferentially adsorbed at edge sites of the graphite.

8. The device or component of claim 1 where the carbonaceous material comprises graphite and there is substantially no intercalation of perhaloaryl ions into the graphite.

9. The device or component of claim 1 where the device or component is an electrode comprising a surface comprising graphite.

10. The device or component of claim 9 where the electrode is a graphite electrode or a composite graphite electrode.

11. The device or component of claim 9 where, at an applied potential over time, the electrode has a first surface current density measured at a first time and a subsequent surface current density measured at a subsequent time, and the first and subsequent surface current densities are substantially the same.

12. The device or component of claim 9 where the electrode is operated at:
an over-potential from 1-150 mV;
an oxidation rate from 1-120 mA·cm$^{-2}$; or
an over-potential from 1-150 mV and an oxidation rate from 1-120 mA·cm$^{-2}$.

13. The device or component of claim 11 where the subsequent time is at least 1 hour after the first time.

14. The device or component of claim 11 where the electrode is exposed to a charge of at least 0.5 ampere-hours/cm$^2$ between the first time and the subsequent time.

15. A cell or a half-cell, comprising an electrode according to claim 9.

16. A flow-cell battery, comprising:
an anode; and
a cathode, where at least one of the anode and the cathode is an electrode according to claim 9.

17. The device of claim 1 where the device is:
a marine vessel comprising a hull and at least a portion of the hull comprises a surface coating comprising graphite, wherein the surface coating is operable as an anode thereby preventing attachment of fouling organisms to the portion of the hull; or
a pipe and at least a portion of the pipe's inner surface or outer surface comprises a surface coating comprising graphite, wherein the surface coating is operable as an anode thereby preventing attachment of fouling organisms to the portion of the pipe's inner surface or outer surface.

18. A method for stabilizing a device, or a component of a device, including a surface comprising a carbonaceous material, the method comprising:
providing a device, or a component of a device, comprising a surface comprising a carbonaceous material; and
exposing at least a portion of the surface to an acidic aqueous solution comprising a concentration of haloaryl ions of 0.001 M-1 M, under oxidizing conditions for a period of time of 5 seconds to 60 minutes such that a plurality of haloaryl ions bind to graphite in the exposed portion of the surface.

19. The method of claim 18 where the carbonaceous material comprises graphite.

20. The method of claim 18 where the acidic aqueous solution comprises:
perhaloaryl ions; and
an oxidizing agent.

21. The method of claim 18 where:
exposing at least a portion of the surface to the acidic aqueous solution is performed at a temperature from 0° C. to 100° C.

22. The method of claim 18, further comprising:
polishing and/or cleaning the portion of the surface prior to exposure to the solution;

washing the exposed portion of the surface with acetone, water, or a combination thereof after exposure to the solution; or a combination thereof.

23. The method of claim 18 where the device or component comprises:

an electrode with a surface comprising graphite, and exposing at least a portion of the surface to the solution comprises flowing the solution through a cell or a half-cell comprising the electrode; or a surface coating comprising graphite, and exposing a least a portion of the surface to the solution comprises dipping the device in the solution, spraying the portion of the surface with the solution, or coating the portion of the surface with the solution.

24. The method of claim 18 where the surface comprises graphite, the surface has sustained oxidative damage as evidenced by a decrease in surface current density at an applied potential over time, and exposing at least a portion of the surface to the solution subsequently stabilizes the surface current density of the device or component at the applied potential.

25. A device, or component of a device, made by the method of claim 18, wherein the haloaryl ions are perhaloaryl ions and the device or component includes a surface comprising a carbonaceous material and a plurality of the perhaloaryl ions bound to at least a portion of the carbonaceous material.

* * * * *